(12) United States Patent
Inbar

(10) Patent No.: US 6,311,419 B1
(45) Date of Patent: Nov. 6, 2001

(54) DEDICATED MAMMOGRAM VIEWER

(75) Inventor: Dan Inbar, Haifa (IL)

(73) Assignee: Smartlight Ltd., Yoknerm-Elit (IL)

( * ) Notice: Subject to any disclaimer, the term of this patent is extended or adjusted under 35 U.S.C. 154(b) by 529 days.

(21) Appl. No.: 08/760,652

(22) Filed: Dec. 4, 1996

Related U.S. Application Data

(62) Continuation-in-part of application No. 08/358,603, filed on Dec. 14, 1994, now abandoned, which is a continuation of application No. 07/861,982, filed as application No. PCT/EP91/00065 on Dec. 28, 1990, now Pat. No. 5,430,964, which is a continuation-in-part of application No. 07/537,799, filed on Dec. 28, 1990, now abandoned, application No. 08/760,652, which is a continuation-in-part of application No. PCT/IL96/00163, filed on Nov. 24, 1996, and a continuation-in-part of application No. 08/849,125, filed as application No. PCT/EP95/04693 on Nov. 27, 1995, now Pat. No. 6,269,565.

(60) Provisional application No. 60/007,522, filed on Nov. 24, 1995.

(30) Foreign Application Priority Data

Dec. 31, 1989 (IL) .................................................... 092936
May 5, 1995 (IL) .................................................... 113623
Dec. 4, 1995 (IL) .................................................... 116252

(51) Int. Cl.⁷ .................................................... G02B 27/02
(52) U.S. Cl. .............................................. 40/361; 40/448
(58) Field of Search ............................ 40/361, 366, 367, 40/448; 362/97, 802; 359/197, 259, 265, 320

(56) References Cited

U.S. PATENT DOCUMENTS

| 1,988,654 | 1/1935 | Haag . |
| 2,436,162 | 2/1948 | Cadenas . |
| 2,516,270 | 7/1950 | Swain . |
| 2,722,762 | * 11/1955 | Krajian .................................. 40/546 |
| 2,754,605 | 7/1956 | Berkeley . |
| 3,246,412 | 4/1966 | Sommerhoff . |
| 3,322,485 | 5/1967 | Williams . |
| 3,492,486 | 1/1970 | Bischoff et al. . |
| 3,714,413 | 1/1973 | Craig . |
| 3,953,764 | * 4/1976 | Miller et al. .................... 40/361 X |
| 4,004,360 | 1/1977 | Hammond . |
| 4,118,654 | 10/1978 | Ohta et al. . |
| 4,335,936 | 6/1982 | Nonomura et al. . |
| 4,368,467 | 1/1983 | Unotoro et al. . |
| 4,373,280 | 2/1983 | Armfield, III . |

(List continued on next page.)

FOREIGN PATENT DOCUMENTS

| 1961126 | 7/1970 | (DE) . |
| 3331762 | 3/1985 | (DE) . |
| 9010889 | 1/1991 | (DE) . |
| 3933988 | 4/1991 | (DE) . |
| 0035382 | 9/1981 | (EP) . |
| 0165548 | 12/1985 | (EP) . |
| 0253379 | 1/1988 | (EP) . |
| 0352101 | 1/1990 | (EP) . |
| 0412757 | 2/1991 | (EP) . |
| 0436267 | 7/1991 | (EP) . |

(List continued on next page.)

OTHER PUBLICATIONS

Patent Abstracts of Japan, vol. 10, No. 206 (P–478).
Patent Abstracts of Japan, vol. 17, No. 387 (P–1576).
Patent Abstracts of Japan, vol. 16, No. 562 (P–1456).

(List continued on next page.)

Primary Examiner—Brian K. Green
(74) Attorney, Agent, or Firm—Fenster & Company Patent Attorneys Ltd.

(57) ABSTRACT

A viewing apparatus for transparencies or the like masks any faceplate areas not covered by images by generating masks, and adapts the luminance level of the image under study and of other faceplate areas to the optimal viewing conditions required by the observer.

17 Claims, 12 Drawing Sheets

U.S. PATENT DOCUMENTS

| | | |
|---|---|---|
| 4,378,557 | 3/1983 | Murata . |
| 4,403,832 | 9/1983 | Tanaka et al. . |
| 4,448,490 | 5/1984 | Shibuya et al. . |
| 4,454,904 | 6/1984 | Oxman . |
| 4,510,708 | 4/1985 | Pokrinchak . |
| 4,637,150 | 1/1987 | R.J. Geluk . |
| 4,707,080 | 11/1987 | Fergason . |
| 4,775,918 | 10/1988 | Snyder . |
| 4,799,083 | 1/1989 | Knodt . |
| 4,833,542 | 5/1989 | Hara et al. . |
| 4,850,675 | 7/1989 | Hatanaka et al. . |
| 4,855,725 | 8/1989 | Fernandez . |
| 4,859,037 | 8/1989 | Iwashita et al. . |
| 4,901,155 | 2/1990 | Hara et al. . |
| 4,908,876 | 3/1990 | DeForest et al. . |
| 4,917,465 | 4/1990 | Conner et al. . |
| 4,952,036 | 8/1990 | Gulick et al. . |
| 4,966,441 | 10/1990 | Conner . |
| 4,977,315 | 12/1990 | Purcell . |
| 4,983,956 | 1/1991 | Salam . |
| 5,124,818 | 6/1992 | Conner et al. . |
| 5,155,608 | 10/1992 | Hatano . |
| 5,159,363 | 10/1992 | Brauning . |
| 5,313,726 | 5/1994 | Yaniv et al. . |
| 5,430,964 | 7/1995 | Inbar et al. . |
| 5,491,332 | 2/1996 | Inbar et al. . |

FOREIGN PATENT DOCUMENTS

| | | |
|---|---|---|
| 2559923 | 8/1985 | (FR) . |
| 2050032 | 12/1980 | (GB) . |
| 2062930 | 5/1981 | (GB) . |
| 6484141 | 3/1989 | (JP) . |
| 8903064 | 4/1989 | (WO) . |
| 9006537 | 6/1990 | (WO) . |
| 9110152 | 7/1991 | (WO) . |
| 9301564 | 1/1993 | (WO) . |
| 9514949 | 6/1995 | (WO) . |
| 9514950 | 6/1995 | (WO) . |
| 9516934 | 6/1995 | (WO) . |
| 9617269 | 6/1996 | (WO) . |
| 9701126 | 1/1997 | (WO) . |
| 9701127 | 1/1997 | (WO) . |

OTHER PUBLICATIONS

J. Nehring, IEEE Transactions on Electron Devices, vol. 26, No. 5, May 1979, New York, US, pp. 795–802, "Ultimate Limits for Matrix Addressing . . .".

T.N. Ruckmongathan, Conference Record of the 1988 International Display Research Conference, Oct. 1988, pp. 80–85, "A Generalized Addressing Technique for RMS Responding Matrix LCD".

H. Hamada, SID 1992, pp. 269–272, "Brightness Enhancement of an LCD Projector by a Plana Mcrolens Array".

IBM Technical Disclosure Bulletin, vol. 33, No. 9, Feb. 1991, New York, US, pp. 261–262, "High Efficiency Backlight for LCD".

Patent Abstract of Japan, vol. 13, No. 314 (P899).

Patent Abstract of Japan, vol. 17, No. 464 (P1599).

Jameson et al., "Visual Psychophysics", pp. VII, VIII, 43–49,54 and 78–101, 1972.

E. Kaneko, "Liquid Crystal TV Displays: Principles and Applications of Liquid Crystal Displays", pp. 77–137.

T.N. Ruckmongathan et al., Japan Display 1992, "S3–4 New Addressing Technique for Fast Responding STN LCDs", pp. 65–68.

K. Tarumi et al. Japan Display 1992, "S15–5 On the Relationship between the Material Parameters and the Switching Dynamics in Twisted Nematic Liquid Crystals", pp. 587–590.

P. M. Alt et al., IEEE "Transactions on Electron Devices" vol. ED–21, No. 2, Feb. 1974, pp. 146–155.

D.P. Carmody PhD. et al., "Global and Segmented Search for Lung Nodules of Different Edge Gradients," Investigative Radiology, May–Jun. 1980. vol. 15. No. 3.

Andreas Abildgaard, MD. et al., "Increasing Contrast When Viewing Radiographic Images", Radiology, vol. 185, No. 2.

Werner E. Haas, *Liquid Crystal Display Research*: The First Fifteen Years, vol. Cryst. and Liq. Crys, vol. 94, P. 1–31 (1983).

*Liquid Crystals, Nature's Delicate Phase of Matter*, by Peter J. Collings Princeton University Press, 1990, Chapter 2, pp. 24–34.

Stephen Balter, et al., *Radiographic Viewing Conditions*, published in the conference proceedings of "Application of Optical Instrumentation in Medicine, 2nd Seminar," SPIE, Nov. 29–30, 1973 pp. 225–227.

J. Blair Hartley, *Film Viewing 1996*, (Ro–B1 20, Yr. Feb. 1967), pp. 96 and 97.

Gerd Rosenbusch, *Radiology in Medical Diagnostics*, 1994, p. 465.

*Physiologishe Problems der Betrachtung des Rontgenbildes* (Psychological Problems in Viewing Radiograph) by Rainer Rohler, dated Feb. 1967, pp. 79 and 86–96 and English translation titled "Physiological Problems of Reading of Radiographs" (Ro–B1, 20 Yr. Feb. 1967).

* cited by examiner

DEDICATED MAMMOGRAM VIEWER

RELATED APPLICATIONS

This application is a continuation-in-part of U.S. patent application Ser. No. 08/358,603 filed on Dec. 14, 1994, now abandoned which is a continuation of U.S. patent application Ser. No. 07/861,982 filed on Jun. 30, 1992, now U.S. Pat. No. 5,430,964 issued Jul. 11, 1995 which is the national stage of PCT/EP91/00065, filed Dec. 28, 1990 which is a C-I-P of U.S. patent application Ser. No. 07/537,799, filed Dec. 28, 1990, now abandoned.

This application is also a continuation-in-part of PCT/IL96/00163 filed Nov. 24, 1996.

This application is also a continuation-in-part of PCT/EP95/04693 filed Nov. 27, 1995 (which was filed as U.S. national application Serial No. 08/849,125 filed on Jun. 4, 1997 now U.S. Pat. No. 6,269,565) which claims the benefit of U.S. Provisional application No. 60/007,522 filed Nov. 24, 1995.

FIELD OF THE INVENTION

The present invention relates generally to a transparency viewing device, more particularly, to apparatus for holding and illuminating X-ray and like transparencies.

BACKGROUND OF THE INVENTION

Medical X-ray transparencies usually are examined by placing them over the faceplate area of a device commonly referred to as an illuminator (or viewbox). Conventional illuminators normally comprise a box-like structure enclosing fluorescent lighting tubes behind a semi-transparent light diffusing faceplate defining a display area. Commonly, transparencies are retained on a surface of the faceplate by pushing the upper edge of the transparencies under spring-loaded film-holder clips located along the top edge of the faceplate.

Standard size illuminators have a faceplate 17 inches high and 14 inches or multiples of 14 inches (i.e. 28 inches or 56 inches) wide. Usually, each 14 inch width of faceplate has its own fluorescent tubes and control switch. Such faceplates enable viewing full size X-ray films which measure 17 inches by 14 inches. In such cases, the sections of the faceplate not covered by transparencies need not be illuminated. This eliminates unnecessary glare from areas outside the transparency.

When transparencies smaller than 14 inches by 17 inches are to be examined, they are typically retained on the faceplate area in the same manner as full size transparencies, i.e., suspending them by means of the film-holders along the top of the viewer. This leaves a portion of the faceplate area surrounding the transparencies fully illuminated and the resulting additional glare detracts from the visual perception of the person trying to study the image and assess the information it contains.

Often, transparencies contain several very transparent areas, and frequently, radiologists have to examine over-exposed transparencies. In these cases, considerable glare emanates through transparent portions of the transparencies themselves, and from the areas surrounding the transparency. Glare causing portions can especially be found in collimated images, multi-exposure images and in certain anatomical regions, such as for example in a chest image, wherein the abdomen portion of the image is very transparent and may interfere with detecting small lesions in the lower part of the lungs.

An important factor in the interpretation of transparencies, is contrast resolution (the ability to discriminate between various levels of light). This ability is determined by Weber's Law. E. H. Weber found that "the minimum perceptible difference in a stimulus is proportional to the level of the stimulus". Stated in terms of vision, as formulated by Fechner, $\delta L/L=K$ (Weber constant); Where $\delta L$ is the minimal detectable difference in luminance; and L is the luminance, see "Visual Psychophysics", D. Jameson and L. M. Hurvich (ed.), Berlin, 1972.

Accordingly, if the eye is adapted to luminance L, $\delta L$ is determined. For a radiologist, maximal gray level discrimination is desired. Therefore, the observer's eye should be adapted to the luminance level of the image under study. In less benign conditions, a person reading an X-ray image will be less able to perceive critical but minor shadings and nuances in the transparency. Moreover, protracted inspection of faceplate areas under less benign conditions involves significant eye strain on the part of the observer.

While it is of course feasible for an observer to overlay masking strips on the faceplate area and on the transparency and thus block unwanted and contrast-reducing light passing through the faceplate area, as a practical matter, readers of X-rays rarely resort to such practice.

Another important factor in the interpretation of transparencies is the intensity of the backillumination. As is known in radiology psychophysics, lesion delectability is optimized when the Luminance level emerging from the transparency is between 200 and 500 $cd/meter^2$, i.e., about 100 nit.

Mammograms are among the most challenging x-ray film transparencies to interpret. One difficulty with viewing mammograms is that the densities of the images are relatively high, so that an intense backillumination is required to achieve an optimum acuity of the eye of the observer of the transparency. Further, masking mammograms is difficult and time consuming. For example, the side of the image nearer the chest contains clinically important details even at the edge of the transparency. Masking which overlaps the transparency results in loosing image content, while spacing the masking from the transparency results in glare which might dazzle the reader. Another difficulty with viewing mammograms is that the size of some of the lesions of interest are very small (micro calcifications are 50–150 microns) on one hand and some of the lesions have a low density on the other hand, so that the backillumination must be artifact free.

An X-ray viewer is typically suitable for reading a wide variety of transparencies. However, this may be a limitation rather than a benefit for a radiologist who specializes in one particular field. A specializing radiologist may be required to use a viewbox which is not optimal for his particular need and, furthermore, the viewbox may have many complicated features which are not necessary for his work. A mammogram specialist, views films which come only in two sizes: 18×24 cm and 24×30 cm. A nuclear medicine or ultrasound specialist on the other hand views images which are 8×10 inches.

This application is a further improvement on a previously filed series of applications for improved display devices for transparencies. These applications, the disclosures, claims, annexes, appendices and drawings of which, if any, are incorporated herein by reference are U.S. Pat. No. 5,430,964 which was filed on Jun. 30, 1992 as U.S. application Ser. No. 07/861,982, a U.S. Provisional application number 60/007,522, entitled "Improved Display Device" filed Nov. 24, 1995 by Inbar, et al., PCT application PCT/EP95/04693 filed Nov. 27, 1995, entitled "Improved Display Device", published as WO96/17269 and PCT application PCT/EP94/03968, published as WO95/14949. The PCT applications name, inter alia, the United States of America as a designated state. The above referenced applications describe methods of masking, back-illuminating and image processing algorithms generally preferred for the practice of the present invention. Israel patent application 114,911, titled "Backprojection Transparency Viewer", filed Aug. 11, 1995, and corresponding PCT application PCT/IL96/00026, the disclosures of which are incorporated herein by reference, describe apparatus useful for a backprojection viewbox and which are also preferred for some embodiments of the present invention. U.S. provisional application No. 60/001814 "Transparency Viewing Apparatus", filed Aug. 1, 1995, its corresponding Israeli application 114,258 of like title filed Jun. 21, 1995, and PCT application PCT/IL96/00023, the disclosures of which are incorporated herein by reference, describe light recycling methods especially suitable for the practice of preferred embodiments of the present invention.

SUMMARY OF THE INVENTION

It is an object of some aspects of the present invention to provide a viewbox which is dedicated for viewing a specific type of X-ray image, preferably mammograms.

It is a further object of some aspect of the present invention to provide a transparency viewer which optimizes viewing conditions for X-ray transparencies. Preferably, the viewer is adapted to viewing mammograms. This adaptation is preferably embodied in at least one of the following ways:

(a) providing a backillumination having a high intensity, preferably with variable intensity and/or chromaticity;

(b) providing a backillumination having a high uniformity and few artifacts;

(c) providing a masking mechanism which provides a high contrast between image carrying portions of the transparency and other parts of the viewing field;

(d) providing a masking mechanism which illuminates all of the image carrying portion of the transparency;

(e) providing a mechanism for viewing only a slot portion of a single or a pair of Mammograms, preferably, with an even higher intensity level than available when viewing an entire mammogram; and (f) not substantially interfering with the high work load of a radiologist using the viewer by providing automation.

Another object of some aspects of the present invention is to provide a high intensity backillumination which is efficient and not overtly power consuming.

Yet another object of some aspects of the present invention is to provide simple sensing means which sense the size and placement of transparencies, especially for use in a motorized viewer.

There is thus provided, in accordance with a preferred embodiment of the invention, a method of scanning a breast in a mammogram, comprising:

determining the location of a nipple in the mammogram;

back-illuminating in a rectangular shape a rectangular portion of the mammogram, including the nipple; and rotating the rectangularly shaped backillumination such that the nipple is always back-illuminated.

There is further provided, in accordance with a preferred embodiment of the invention a viewbox, comprising:

a faceplate adapted for mounting of a transparency thereon;

a back-illumination source;

a mask-generator which generates an back-illuminated region of interest which scans the transparency; and a control operative to momentarily increase the intensity of back-illumination in the region of interest.

Preferably the control comprises a foot-pedal.

There is further provided, in accordance with a preferred embodiment of the invention, a viewbox comprising:

a light source;

a housing defining a first aperture therein, enclosing said light source;

a faceplate adapted for holding a transparency thereon; and means for rotating said housing so that light is emitted from the first aperture to scan said transparency.

In a preferred embodiment of the invention the first aperture comprises a rectangular slot.

Preferably, the housing defines a second aperture, wherein when said housing is rotated such that the second aperture is disposed between the light source and the transparency, substantially the entire transparency is illuminated.

Preferably, the viewbox includes means for reducing the intensity of the light source when the transparency is illuminated by light from the first aperture.

Preferably the viewbox includes a reflector adjacent to the housing and which reflects light, which is emitted via the aperture not illuminating the transparency, back into the housing.

In a preferred embodiment of the invention the viewbox further comprises a masking LCA for masking portions of said emitted light. Preferably the LCA comprises segments having a larger vertical extent than its horizontal extent.

Preferably, the viewbox includes a second backillumination source which back-illuminates the transparency. Preferably the viewbox includes a mask generator which modulates light from the second backillumination source for back-illuminating the transparency.

There is further provided, in accordance with a preferred embodiment of the invention a motorized viewbox comprising:

a faceplate adapted for mounting a transparency thereon;

a transparency conveyer, for conveying the transparency from a storage location to the faceplate along a path;

only a single sensor located in the path and which generates a first signal at a portion of the conveyer occupied by the transparency and a second signal at a portion of the conveyer not occupied by the transparency; and a patterned back-illuminator which back-illuminates only a portion of the faceplate, responsive the signals generated by the single sensor.

Preferably, the sensor is a single sensor. Preferably the single sensor has a rectangular aperture having a significant extent in a direction perpendicular to the path. Preferably the single sensor generates a third signal at a portion of the conveyer occupied by a clear portion of the transparency and wherein the back-illuminator does not back-illuminate a vertical segment of the transparency which corresponds to the clear portion.

There is further provided, in accordance with a preferred embodiment of the invention a method of transparency size determination comprising:

back-illuminating a faceplate having a transparency mounted thereon at a first intensity;

measuring an exit intensity of light exiting the viewbox during the back-illuminating; and determining the transparency size of the transparency responsive to the measured intensity.

Preferably the method includes:

back-illuminating the faceplate at a second intensity;

measuring a second exit intensity of light exiting the viewbox during the back-illuminating at the second intensity; and determining the transparency size of the transparency responsive to the measured intensity and the second measured intensity.

There is further provided, in accordance with a preferred embodiment of the invention a transparency holder for holding a conveyed transparency in a motorized viewbox, comprising:

means for mounting a transparency thereon;

at least one sensor which generates a signal responsive to the size of the transparency; and a guide which guides the insertion of a transparency into a predetermined position in the transparency holder.

Preferably the holder is comprised in a belt.

There is further provided, in a preferred embodiment of the invention, a viewbox comprising:

a faceplate adapted for mounting of a transparency thereon;

a back-illumination source;

a transparency detector which determines a loci associated with the transparency; and a mask-generator which spatially modulates the back-illumination to illuminate at least a portion of the transparency, responsive to the determined loci, wherein, the transparency detector can only differentiate between two transparency sizes.

Preferably the transparency detector detects the distance between the transparency and a second transparency mounted on the faceplate.

There is further provided, in accordance with a preferred embodiment of the invention, a viewbox comprising:

a faceplate adapted for mounting of a pair of transparencies thereon;

a back-illumination source;

a transparency detector which determines the size of one of the transparencies and the distance between the pair of transparencies; and a mask-generator which spatially modulates the backillumination to illuminate corresponding portions of each of the transparencies, responsive to the determined size and distance.

There is further provided, in accordance with a preferred embodiment of the invention an optical transparency detection clip for a back-illuminated viewbox, comprising:

a transparency holder defining a gap therein for grasping a transparency;

a light source, on one side of the gap, which transmits light; and an optical sensor, on an opposite side of the gap, which senses light which crosses the gap and generates a signal indicative of the intensity of the sensed light.

Preferably, the optical sensor generates a first signal when there is no transparency inserted into the gap and a second signal when there is a transparency inserted into the gap.

Additionally or alternatively the optical sensor preferably generates a first signal when there is no transparency inserted into the gap, a second signal when a dark portion of the transparency is inserted into the gap and a third signal when a clear portion of the transparency is inserted into the gap.

Preferably the light source conveys light from the back-illumination.

Preferably the optical sensor is a polarized sensor.

There is further provided a clip array comprising a plurality of clips each as described above wherein the clip array generates a signal indicative of a size and a position of a transparency inserted in the clip array.

There is further provided, in accordance with a preferred embodiment of the invention a viewbox comprising:

a faceplate adapted for mounting of a transparency thereon and having a guide for guiding the transparency into a predetermined mounting position;

a back-illumination source;

a transparency detector which determines a size associated with the transparency; and a mask-generator which spatially modulates the back-illumination to illuminate at least a portion of the transparency, responsive to the determined size, wherein the faceplate is adapted for mounting a second transparency having a second predetermined mounting position, wherein the guide separates and determines the two predetermined mounting positions.

Preferably the mask generator comprises a directly addressed light valve having a first segment corresponding to a first transparency size and a second segment corresponding to a second transparency size. Preferably, the light valve is a segmented LC (liquid crystal).

There is further provided, in accordance with a preferred embodiment of the invention a transparency detection clip for a back-illuminated viewbox, comprising:

a transparency holder defining a gap therein for grasping a transparency;

a first transparency insertion sensor at a first location on the transparency holder; and a second transparency insertion sensor at a second location on the transparency holder, wherein the clip generates three occupancy signals: a first signal when neither of the sensors are occupied, a second signal when both sensors are occupied and a third signal when only one of the sensors is occupied.

There is further provide, in accordance with a preferred embodiment of the invention a masking generator for masking backillumination for a transparency, comprising:

a plurality of vertical light-valves, comprising at least a first light valve having a first width and at least a second light valve having a second, greater, width, wherein all the light valves have the same length.

Preferably the plurality of light valves are vertically segmented along a single line.

Preferably the at least a first light valve is associated with mask generation near an edge of the transparency and wherein the second light valve is associated with mask generation near the center of the transparency.

In a preferred embodiment of the invention when the transparency has an edge containing clinically important image information, the at least a first light valve is associated with mask generation along the edge containing clinically important image information.

Preferably, when the transparency has an underexposed vertical segment, the at least a first light valve is associated with mask generation of the underexposed vertical segment.

There is further provided, in accordance with a preferred embodiment of the invention, a motorized viewbox comprising:

a faceplate adapted for mounting a transparency thereon;

a transparency conveyer, for conveying the transparency from a storage location to the faceplate along a path;

at least one sensor located in the conveyer which generates signals indicative of loci of the transparency; and a patterned back-illuminator which back-illuminates only a portion of the faceplate, responsive the signals generated by the at least one sensor.

There is further provided, in accordance with a preferred embodiment of the invention, a motorized viewbox comprising:

a faceplate adapted for mounting a transparency thereon;

a transparency conveyer, for conveying the transparency from a storage location to the faceplate along a path;

a sensor which generates a signal indicative of a relative position of the conveyer and the faceplate; and a patterned back-illuminator which back-illuminates only a portion of the faceplate, responsive the signals generated by the sensor.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF THE PREFERRED EMBODIMENTS

As described herein, the present invention employs several sub-systems and encompasses, for some of them, several alternative methods of operation, thus resulting in a large number of permutations. This detailed description illustrates a few such embodiments and variations according to the invention. Other combinations are also useful and fall within the scope of the invention. In particular, although the preferred embodiments may be described in a way which is especially suitable for viewing mammograms, the present invention is also useful for viewing other types of X-ray transparencies.

Figure 1:
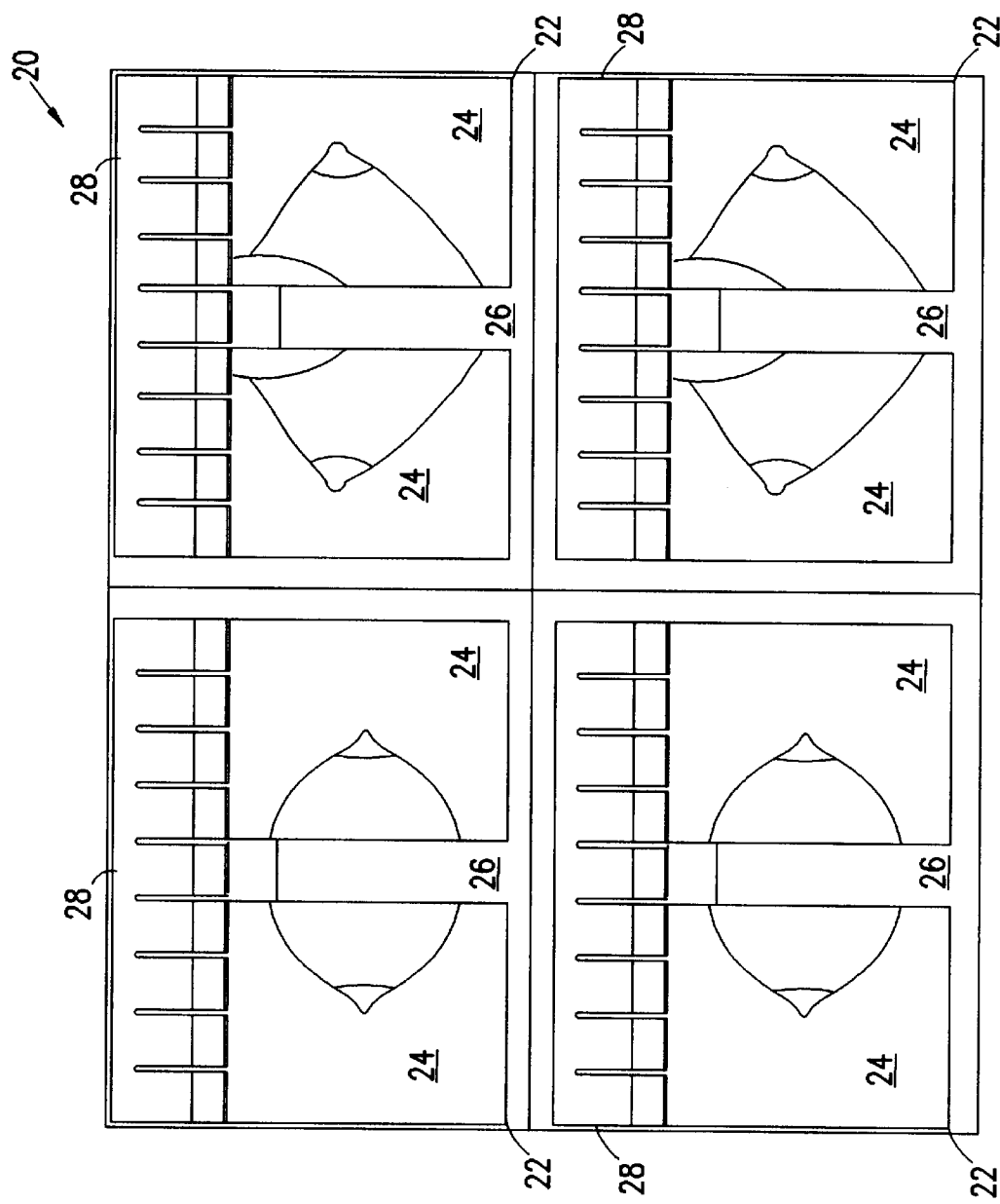
FIG. 1 is a front view of a dedicated mammography viewbox according to a preferred embodiment of the invention.

FIG. 1 is a front view of a dedicated mammography viewbox 20 according to a preferred embodiment of the invention. Viewbox 20 is preferably sub-divided into four panels 22, so that a current and a previous study can be viewed simultaneously. A plurality of transparencies 24 is mounted on faceplate 26, preferably held by a plurality of clips 28. Portions of faceplate 26 which are behind image carrying portions of transparencies 24 are preferably back-illuminated so that an operator can interpret images on transparencies 24. Portions of faceplate 26 which are not covered by transparencies 24 or portions which are covered by transparent portions of transparencies 24 are preferably dark. Preferably, the darkness is achieved by masking back-illumination at portions of faceplate 26, as described below. When so operated, viewbox 20 does not generate glare which might dazzle the operator.

Preferably, viewbox 20 controls the ambient lighting and/or the intensity of the backillumination and/or the chromaticity of the backillumination and/or the backillumination of the uncovered portions of faceplate 26. Thus, viewbox 20 controls and may optimize all of the viewing parameters which may affect the perceived image quality. Preferably, the optimization of the viewing conditions, including at least one of: masking, backillumination level, ambient light level and chromaticity of the backillumination, is in response to the image density of at least a portion of one of transparencies 24. More preferably, the viewing of a particular region of interest on one or more of transparencies 24 is optimized.

The intensity and uniformity of the backillumination of transparencies 24 and the darkness of the non-illuminated portions of faceplate 26 are preferably at least as good as required by the U.S. government, as set forth in the MQSA (mammography quality standards act).

Figure 2:
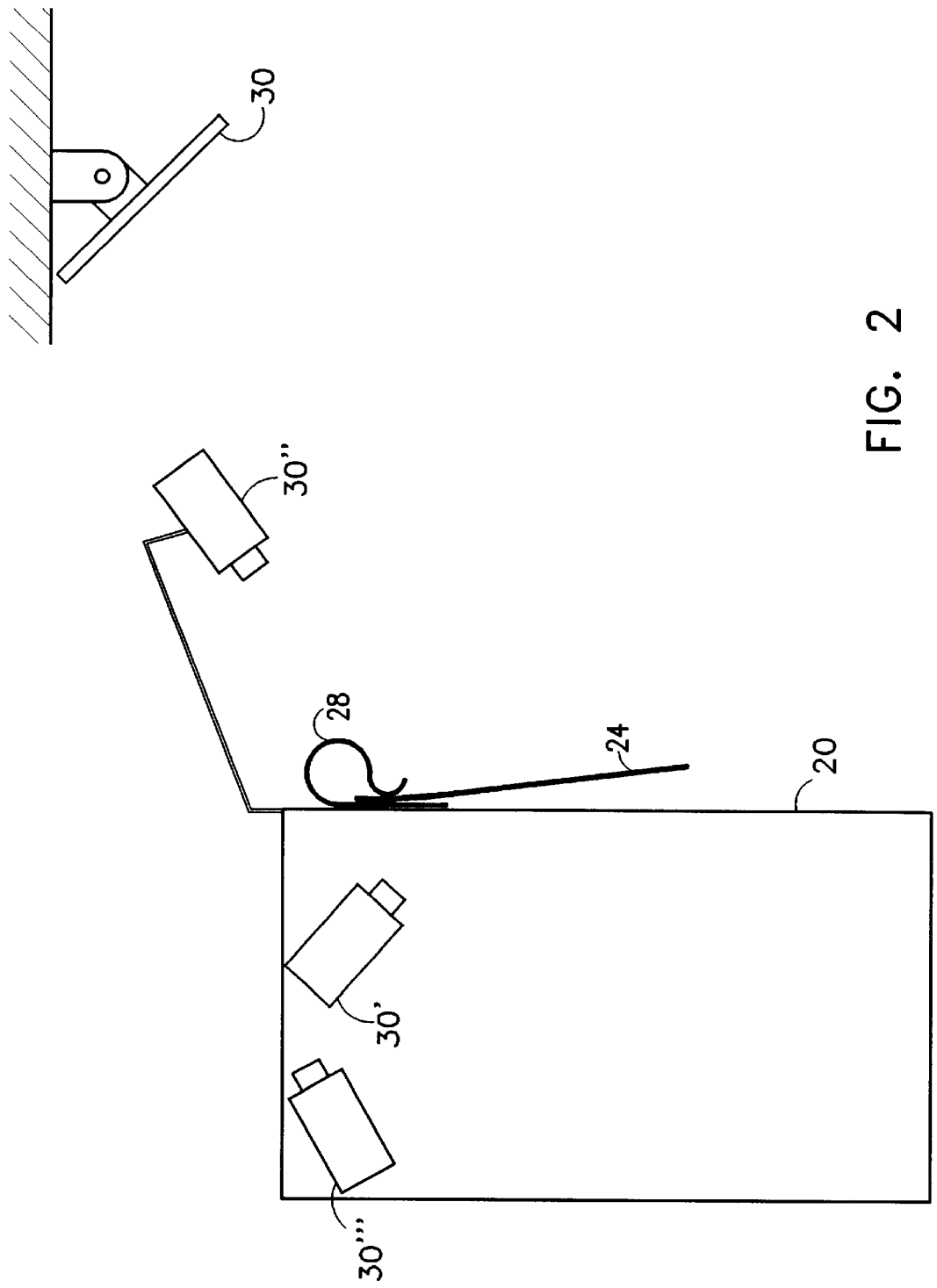
FIG. 2 is a partial schematic side view of a viewbox showing preferred locations for an optical sensor in a viewbox according to a preferred embodiment of the invention.

In a preferred embodiment of the invention, viewbox 20 automatically detects the transparency size and/or location and controls the backillumination so that faceplate 26 is only back-illuminated at locations covered by transparencies 24. FIG. 2 shows preferred methods of detecting the location and/or size of transparencies 24. One preferred method is acquiring an image of faceplate 26 and transparencies 24 using a camera 30" mounted on the outside of viewbox 20. This image is processed to determine the size, location and, preferably, the morphology of transparencies 24. An alternative location for camera 30" is at location 30', inside of viewbox 20. Further alternatively, and more preferably, a camera views the reflection of faceplate 26 in a mirror 30.

Figure 3A:
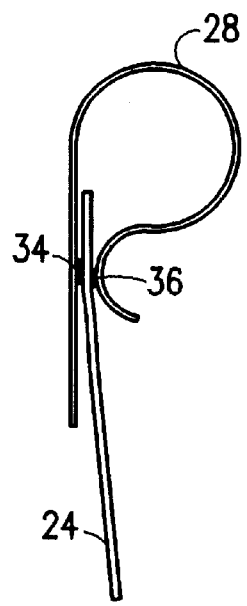
FIGS. 3A–B show schematic side views of a position detection clip according to a preferred embodiment of the invention.
Figure 3B:
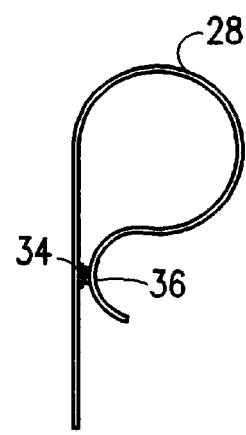
Figure 3C:
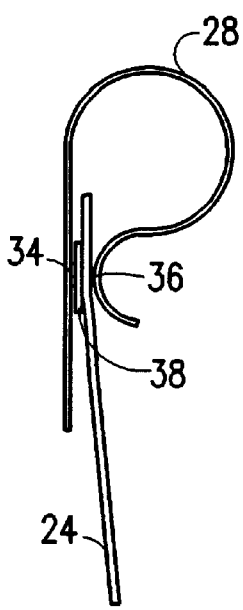
FIGS. 3C–D show schematic side views of an optical position detection clip according to an alternative preferred embodiment of the invention.
Figure 3D:
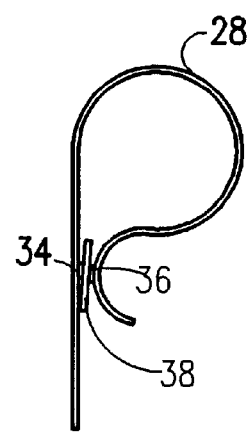
Figure 3E:
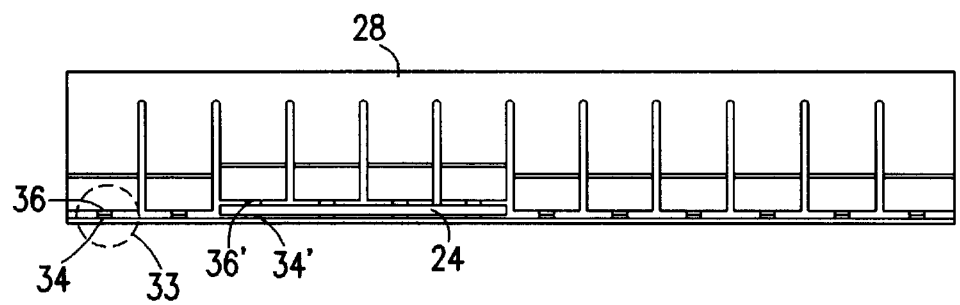
FIG. 3E is a schematic bottom view of a position detection clip according to preferred embodiments of the invention.

Alternatively or additionally, the existence and/or size and/or location of transparencies 24 is detected by a position sensing clip 28. FIG. 3E is a front view of clip 28. A plurality of sensors 33 are arranged along clip 28, wherein a first part of each sensor 33 is a portion 34, generally in one plane of clip 28 and a second part of each sensor 33 is a portion 36, generally in a second plane of clip 28. When transparency 24 is inserted in clip 28, a plurality of sensor portions 34' are disconnected from their corresponding sensor portions 36'. This disconnection can be sensed in many ways, including the following:

(a) Sensor 33 may be a capacitance sensor which senses the changes in capacitance caused by the displacement of portion 34' from portion 36' and/or by the imposition of film material having a dielectric constant much higher than that of air (transparency 24).

Figure 3F:
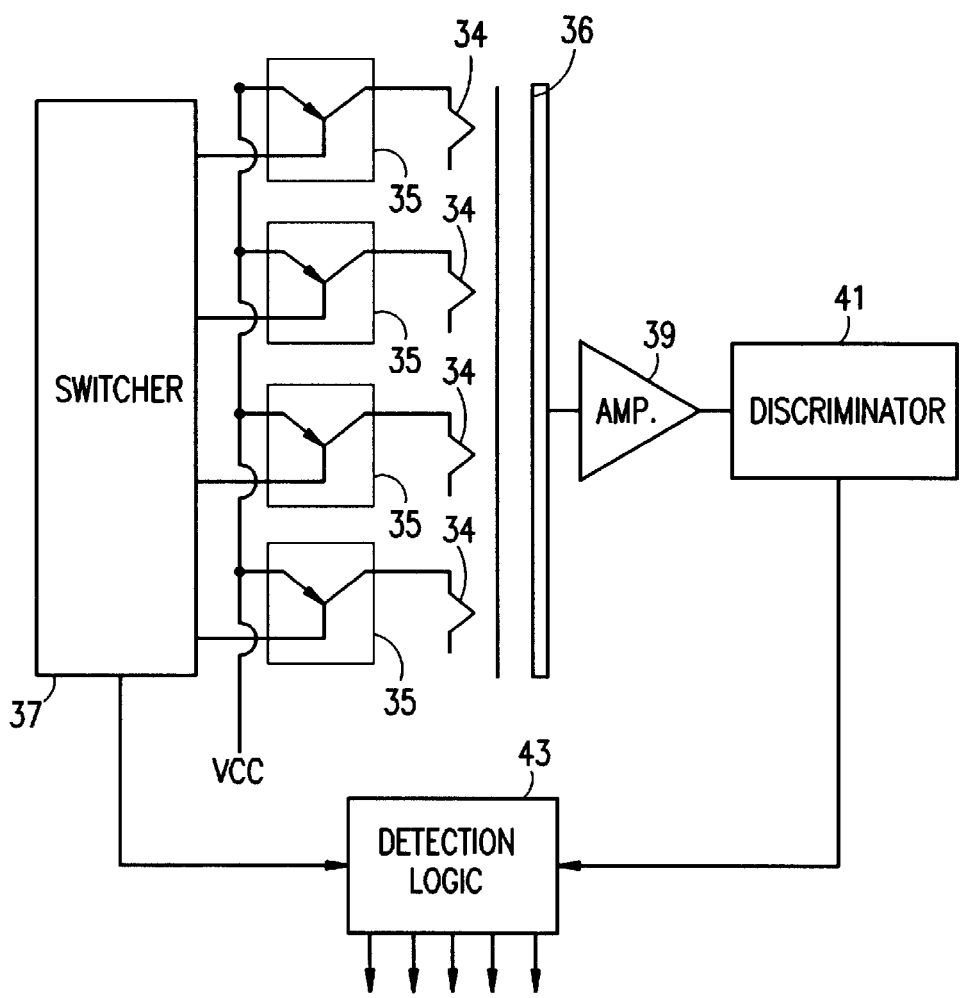
FIG. 3F is an electrical schematic of a resistance type position detector clip according to a preferred embodiment of the invention, such as shown in FIGS. 3A–B.

(b) Sensor 33 may be a resistance sensor which senses the absence of contact between portions 34' and their corresponding portions 36'. A side view of a resistance sensor is shown in FIG. 3A (open position) and in FIG. 3B (closed position). In this embodiment sensor portions 34 and 36 are electrodes. The current source for this resistance sensor preferably has a high impedance output, so that the quality of contact between sensor portion (electrode) 34 and sensor portion (electrode) 36 is not important. FIG. 3F is an electrical schematic of a resistance sensor which incorporates a plurality of sensors 33. A control unit 37 sequentially connects one of a plurality of current sources 35 to an electrode (34). A single common electrode (36) is used for all of the source electrodes. The sensed current is amplified by a current amplifier 39 and passed to a discriminator 41 which decides if there is an electrical contact. A detection logic 43 outputs the state of clip 28, based on the scanning sequence which logic 43 receives from control unit 37. Preferably, the back of clip 28 is a PCB board incorporating sensor portions (electrodes) 36, while sensor portions (electrodes) 34 are mounted on leaf springs, which are connected to the PCB board.

(c) Sensor 33 may be an optical sensor. FIG. 3C and 3D show such an embodiment where portion 34 is a light source and portion 36 is a light sensitive element. The light sensitive element is preferably solid state device. The light source is preferably an unmasked portion of the backillumination, which may be guided to behind clip 28. Alternatively, the light source may be a solid state light source or a light pipe.

An optical sensor is preferred since it not only senses the imposition of transparency 24 (even an unexposed portion of X-ray film attenuates light) but also detects the difference between exposed and unexposed portions of transparency 24. Thus, if a vertical strip of transparency 24 is unexposed (as is often the case in Mammograms), the masking can be configured mask the unexposed vertical strip. Preferably, the light source is a polarized light source, preferably by virtue of a polarizer 38. Using polarized light enhances the sensitivity of sensor 33 to the imposition of transparency 24, as transparency 24 typically has a retardent effect on polarized light. The major retardation axis is usually parallel to one of the transparency edges. Thus, the polarization is preferably at 45 degrees to the longitudinal direction of clip 28. Sensor element 36 preferably has a polarizing input either parallel to or perpendicular to the polarization axis of polarizer 38. In a case where no transparency is placed between light source 34 and sensor element 36 the amount of light detected by sensor 38 will be low (if the polarizers are perpendicular). If a transparency portion is placed between, the polarization of the light from source 36 will be affected by the bi-refringent properties of the transparency and a substantial amount of light will be detected by sensor element 33. The precise amount of detected light depends on the density of the transparency. A high density transparency will block most of the light, while a low density transparency will pass most of the light. A further discussion regarding the effect of a transparency on a polarizing sensor (albeit not in direct contact therewith) and various configurations of a polarizing sensor are described in WO96/17269, cited above.

(d) Sensor 33 may be an ultrasonic sensor comprising a transmitter and a receiver, wherein the amount of transmission is affected by the imposition of transparency 24.

It should be appreciated that there are only two standard sizes of x-ray mammography transparencies so the signal processing associated with detecting the film sizes and locations is relatively simple.

Figure 4A:
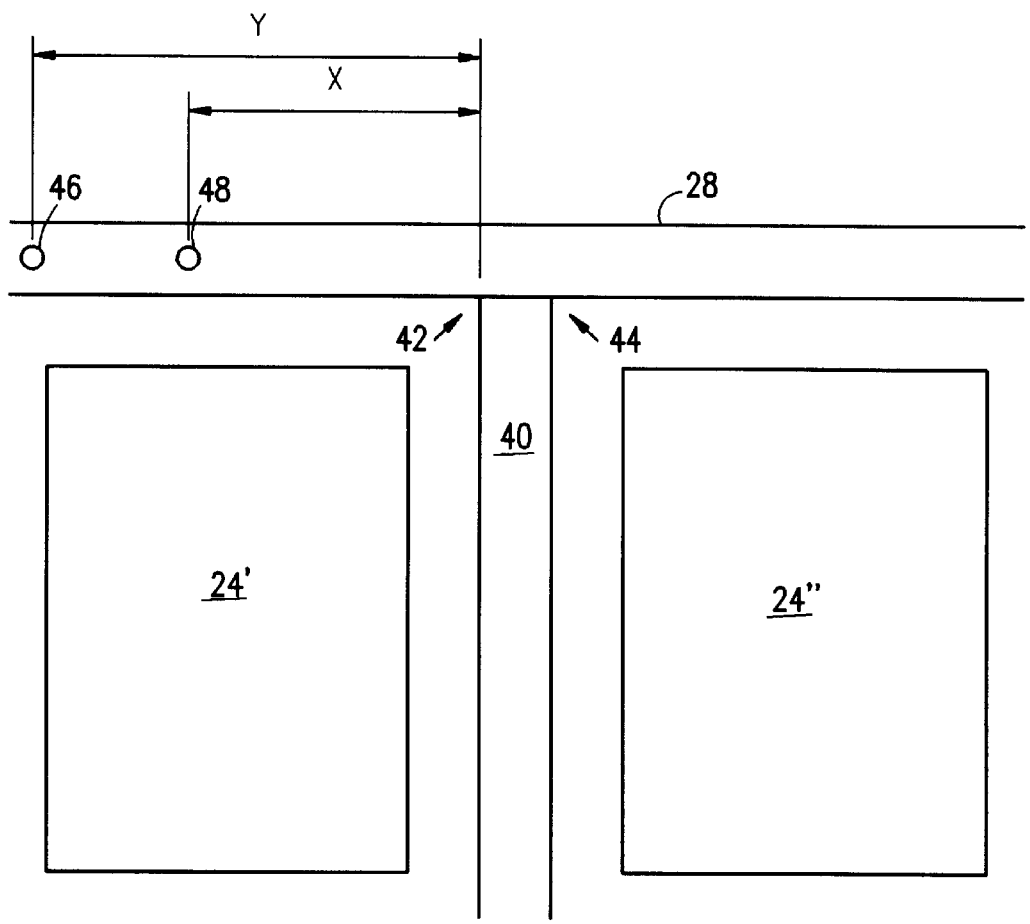
FIGS. 4A and 4B show a preferred embodiment of a guided placement faceplate.
Figure 4B:
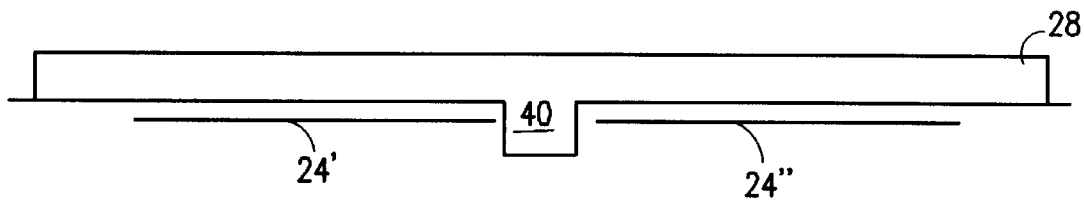

In a further preferred embodiment of the invention, the placement of transparencies 24 is guided into predetermined positions. Thus, a single sensor is sufficient to determine the transparency size of each transparency. A second sensor may be used to determine the existence of said transparencies. FIG. 4A shows a preferred guidance method. A guide 40 vertically bisects faceplate 26 and clip 28. A left mammogram 24' is inserted in the general direction 42, so that it is slid along guide 40 and into clip 28. A right mammogram 24" is inserted in the general direction 44, so that it is slid along guide 40 and into clip 28. FIG. 4B shows a top view of the guidance method shown in FIG. 4A.

A first sensor 48 is preferably placed at a distance X from guide 40, so that, also a smaller sized transparency will be detected by sensor 48. A second sensor 46 is preferably placed at a distance Y (>X) from guide 40, so that only a larger sized transparency will be detected by sensor 46. Thus, both the existence and the size of transparency 24 can be determined. In a preferred embodiment of the invention, sensors 46 and 48 are combined into a single resistive sensor having three states. If there is a transparency at sensor 46 but not at sensor 48, an electrical resistance between the location of sensor 46 and sensor 48 is measured if there is a transparency also at sensor 48, the sensor is open, so an infinite resistance is measured and if there is no transparency, the sensor is short circuited, so a zero resistance is measured.

Since the backillumination of the mammogram must illuminate transparency 24 up to the edge at its chest side, a soft mask is preferably used at this edge. Soft masking is a mask which does not have a well defined edge, rather, the intensity of the backillumination gradually falls along a direction normal to the edge. As a result, there is a vertical strip along the chest side of transparency 24 which has sufficient backillumination for identifying details, but not so much backillumination through uncovered portions of faceplate 26 that might dazzle the operator. The width of the soft masking is generally the required precision of the masking in general, since there is a wider margin for error on the other side of transparency 24. Thus, in a preferred embodiment: of the invention using guided placement, soft masking may be dispensed with. It should be appreciated, that the masking, described below, preferably incorporates a diffuser, so that the edges of the mask have a soft transition of, preferably, about 1–2 millimeters.

In a preferred embodiment of the invention, the masking of the backillumination is achieved by generating a substantially uniform backillumination and then masking portions thereof using at least one layer of a liquid crystal array (LCA). The incorporated documents referred to above, and especially WO96/17269, describe several preferred ways of generating backillumination and a masking thereof. However, in a dedicated mammogram viewer there are some additional preferred embodiments.

Figure 5A:
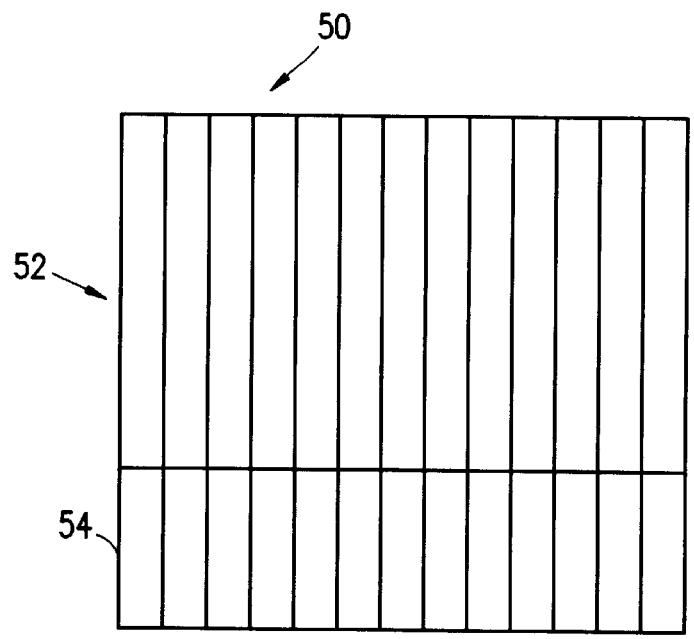
FIG. 5A shows, a vertically segmented LCA suitable for masking in a viewbox according to a preferred embodiment of the invention.

FIG. 5A shows a segmented vertical LCA 50, useful in a preferred embodiment of the invention. LCA 50 may be used instead of one or both of the LCA layers suggested in the above reference applications, depending on the desired contrast ratios, on the necessity of soft masking and on the method of producing the slot, described below. LCA 50 is composed of a plurality of vertical LC elements, each of which are segmented into several, preferably two, segments. A first plurality of segments 52 are the length of the smaller size of mammography film and a second plurality of segments 54 are the length of the difference in lengths between the smaller size of mammography film and the larger size of mammography film. Preferably, segments 52 and segments 54 are independently controlled, so that each of segments 52 and segments 54 is a one dimensional LC array. As can be appreciated such an array can achieve high contrast ratios using direct or active or passive addressing. However, a very high contrast ratio can be achieved by using a passive 1×2 driving scheme as described in PCT/EP95/04693.

Figure 5B:
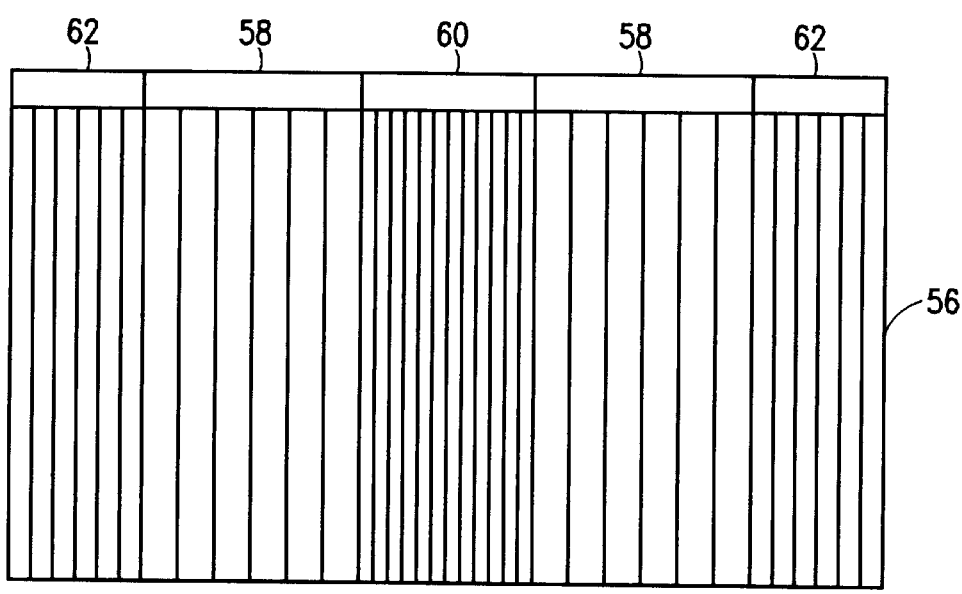
FIG. 5B shows a variable-resolution LCA suitable for masking in a viewbox according to another preferred embodiment of the invention.

FIG. 5B shows an LCA 56 which has a non-constant horizontal resolution and which is used in another preferred embodiment of the invention. Two generally low resolution portions 58 are located behind where a pair of transparencies 24 is expected to be placed and a generally high resolution portion 60 is located behind where the chest sides of transparencies 24 are expected to be placed. Thus, a high resolution of masking at the chest side of the transparencies can be achieved, without requiring a high resolution throughout the entire LCA 56. Preferably, a third portion 62 has a medium resolution behind where the outer edges of transparencies 24 are expected to be. Thus, a transparent vertical strip in transparencies 24 can be easily masked.

It should be appreciated that in a viewbox which guides the placement of transparencies 24, such as described above, the entire masking LCA can be divided into two portions for activation purposes. A first portion includes the portion of the LCA which is behind two smaller mammograms and a second portion which includes the portion of the LCA which is covered by the larger size of mammograms but not by the smaller size. Thus, the LCA is actually a direct addressing two element LC, in which very high contrast ratios can be achieved.

It should be appreciated that other masking methods, such as mechanical masking methods, as are well known in the art, can also be used to mask transparencies 24.

In a preferred embodiment of the invention, the operator's finger or other control means can be used to indicate locations on transparencies 24 to a controller (not shown) in viewbox 20. This is particularly useful in a computer aided diagnostic station. In such a station, a digitized mammogram is displayed on a monitor and a corresponding transparency is mounted on viewbox 20. The operator can point to a portion of the transparency, prompting the diagnosing computer to display suggestions, such as suspected lesions and a comparison with a previous study. Alternatively or additionally, a computer analyzes the digitized mammogram (which need not be shown) to detect clinically interesting portions and/or suspected lesions which are then highlighted by viewbox 20, for example, as described below with respect to ROIs (region of interest). Additionally or alternatively, such reflexive pointing (operator to computer and back) can be used between, preferably registered, images of similar or dissimilar modalities. Finger detection methods and reflexive pointing methods are further set forth in WO96/17269, in WO93/01564 and in PCT/EP94/03791, published as WO95/14950, the disclosures of which are incorporated herein by reference.

Figure 6C:
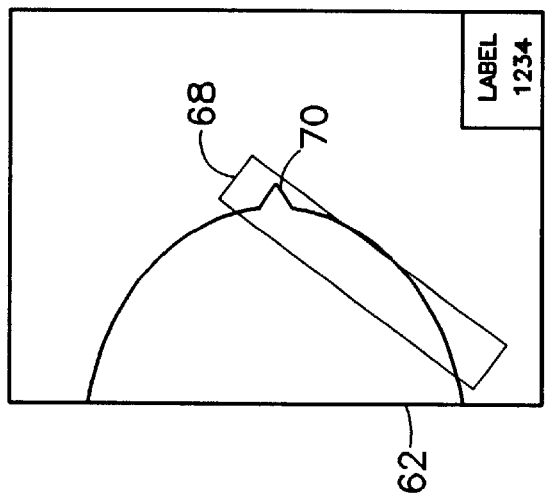
FIGS. 6A–C show various preferred regions of interests for viewing mammograms.
Figure 6B:
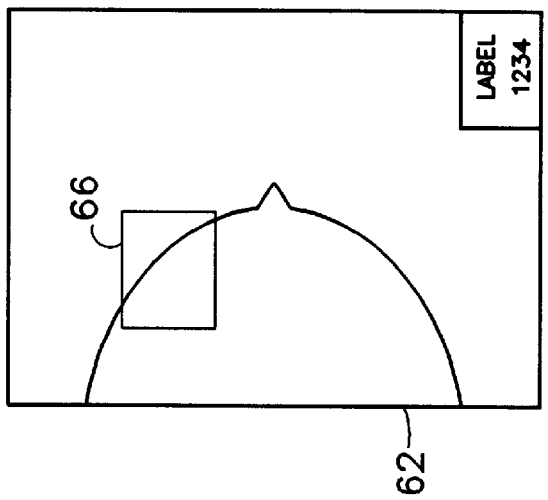
Figure 6A:
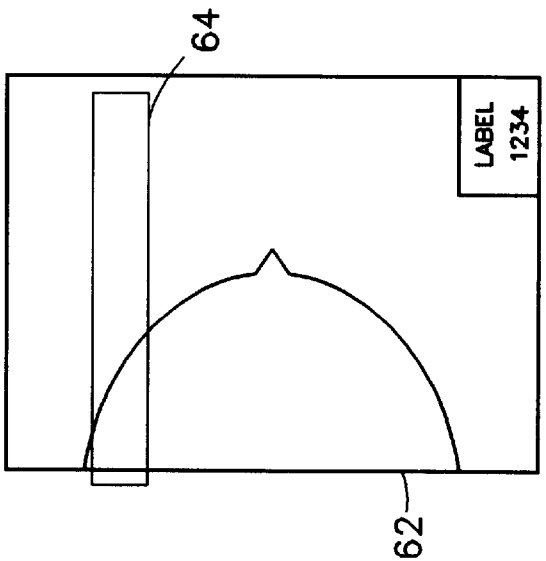

FIG. 6A shows one preferred method of viewing mammograms, in which a horizontal slot 64 scans the image from top to bottom. Preferably, the intensity of backillumination outside of slot 64 is substantially zero.

FIG. 6B shows another preferred method of viewing mammograms. In this method, an ROI 66 is used to highlight a portion of the image.

FIG. 6C shows yet another preferred method of viewing mammograms. In this method a slot of lighted area 68 extends through a nipple 70, and scans the mammogram radially as the slot rotates around the nipple as a pivot. PCT publication WO96/17269 describes methods of image processing which can be used to determine the image features of the mammogram and to generate ROIs which backilluminate substantially only a portion of transparency 24. In particular, these methods can be used to determine the location of nipple 70, since nipple 70 is both the outermost portion of the image and forms the apex for a general triangular shape of the image. In addition, nipple 70 serves as a useful reference point in the image, therefore for reference purposes, the distance and direction from nipple 70 to a detected lesion are preferably measured and noted.

The methods of FIGS. 6A and 6C are preferably semi-automatic, with the operator indicating when to start scanning and when to stop. Typically, both left and right mammograms are scanned simultaneously at the same relative positions.

Figure 9:
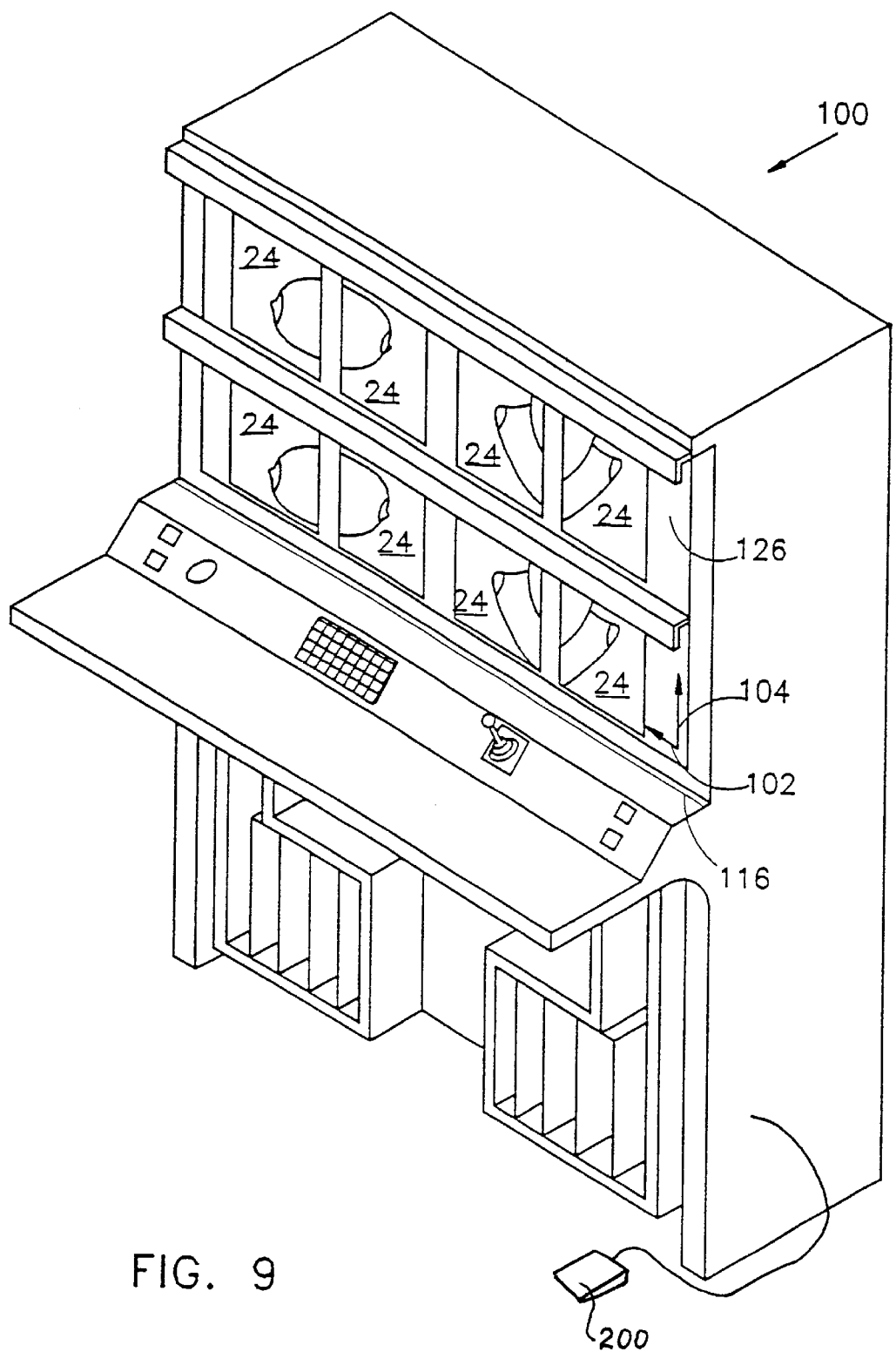
FIG. 9 is a perspective front view of a motorized viewbox according to a preferred embodiment of the invention.

In a preferred embodiment of the invention, the intensity of the backillumination can be momentarily intensified by operator command, such as by pressing a foot pedal (See FIG. 9). In many cases, the higher intensity level improves the reader's visual acuity. This intensification is useful to replace the manually positioned (or external) spotlight used by many radiologists today when a high density region is encountered.

Generally, it is difficult to achieve high backillumination intensities using florescent lamps. Thus, in a preferred embodiment of the invention, further described in PCT application PCT/IL96/00026, a backprojection illumination system is used.

Figure 7:
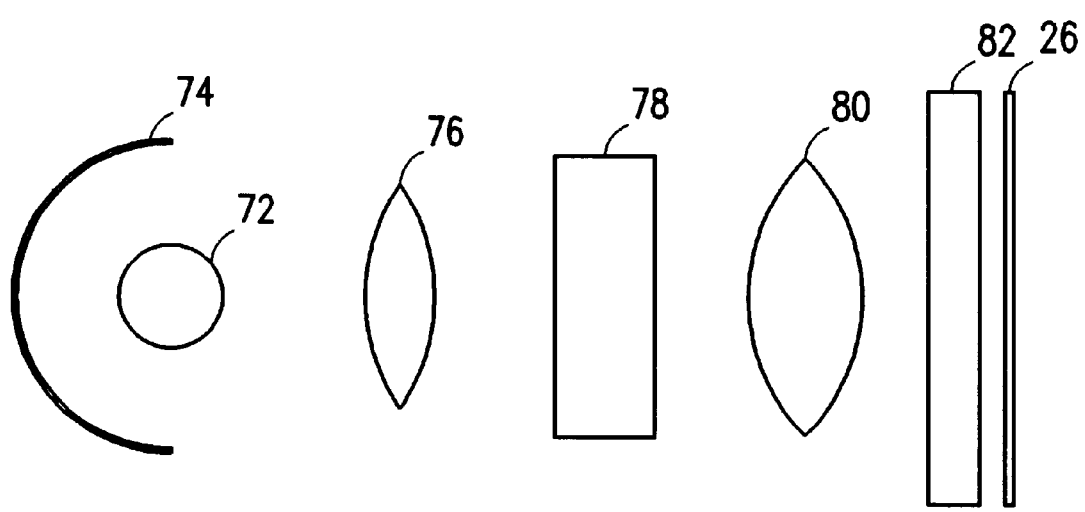
FIG. 7 is a schematic side view of a projection system for a viewbox according to a preferred embodiment of the invention.

FIG. 7 shows; one preferred embodiment of such a backprojection system. Light from a light source 72, preferably a metal-halide lamp, is concentrated by a backreflector 74. The light is projected onto faceplate 26 using a lens 80. Masking of the light is preferably performed using at least one of the two masking methods:

(a) converting the light to a substantially parallel beam using condenser 76, imposing a masking pattern on the light beam using an LCA 78 and projecting the patterned light beam onto faceplate 26; and/or (b) imposing a pattern on the projected light beam using at least one face LCA 82.

Figure 8A:
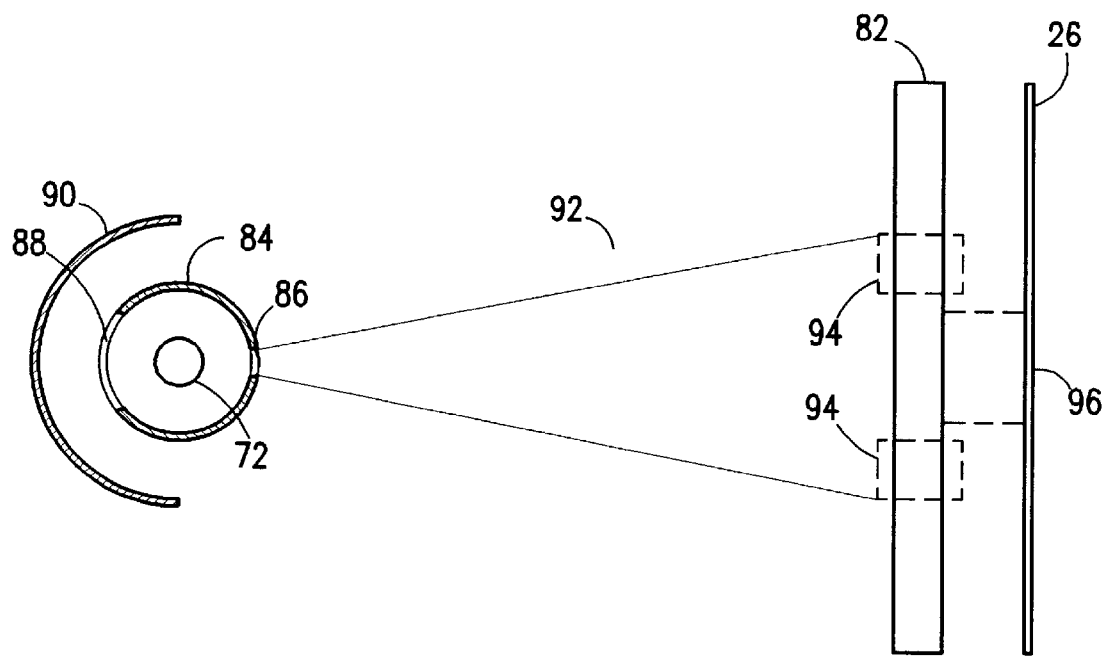
FIG. 8A is a schematic side view of a mechanical masking apparatus for a projection viewbox according to a preferred embodiment of the invention.

Projected backillumination is also preferred due to the ease of mechanically masking and recycling light source 72. FIG. 8A shows apparatus for generating a scanning slot, as shown in FIG. 6A. Light source 72 is encased in a slotted cylinder 84. Cylinder 84 preferably has a reflective interior, so that light which does not exit the cylinder is recycled. A first slot 86 in cylinder 84 is a narrow slot, so that a light cone 92, exiting though slot 86 creates backillumination similar to that shown in FIG. 6A. Preferably, a second slot 88 is also formed in cylinder 84 so that it is possible to back-illuminate the entire faceplate 26 by rotating cylinder 84 so that slot 88 faces the faceplate. It should be appreciated that since slot 86 is typically narrower than slot 88, the intensity of light exiting slot 86 is typically higher than the intensity of light exiting slot 88, as most of the light is recycled by cylinder 84, rather than absorbed. As a result, it may be desired to reduce the intensity of light source 72 when using slot 86, such as by reducing the voltage to source 72 or using other means of reducing light well known in the art. Preferably, cylinder 84 is backed by a reflector 90 which recycles light which escapes through one slot when the other slot is in use.

Typically, light cone 92 is wider than necessary for back-illuminating slot 64 (FIG. 6a). Typically, a wider light cone is desired if the orientation of cylinder 84 is not precisely known and/or if there are artifacts at the edges of light cone 92. Thus, in a preferred embodiment of the invention, LCA 82 is activated at least at portions 94 to mask portions of light cone 92, so that the resulting backillumination of faceplate 26 is limited to a smaller area 96 and there is no illumination "leakage" to undesired locations. Alternatively or additionally, light cone 92 can be masked by LCA 82 to produce highlighted portions shaped differently than slot 86. Preferably, LCA 82 has vertical segments to mask transparent portions of the transparencies and/or spaces between the transparencies.

Figure 8B:
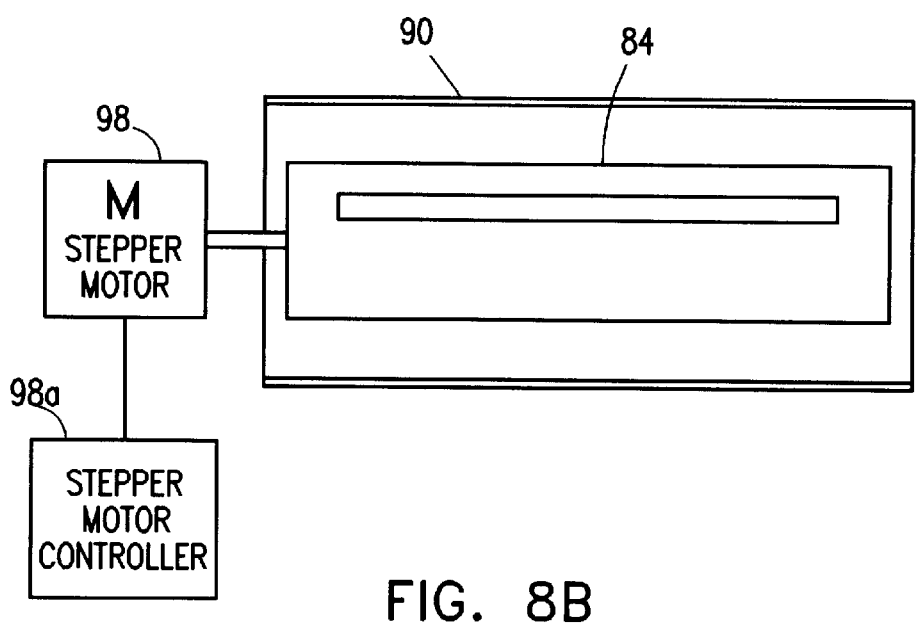
FIG. 8B is a schematic front view of a slotted cylinder, such as shown in FIG. 8A.

FIG. 8B shows a front view of cylinder 84, also showing a preferred method of rotating cylinder 84. A stepper motor 98 is preferably used to rotate cylinder 84 between rotational positions. A controller 98a, which controls motor 98, is preferably operative to:
  (a) switch between full-field illumination and slot illumination by rotating cylinder 84;
  (b) position cylinder 84, under viewbox control, so that a particular slot 64 is back-illuminated and/or scanned; and
  (c) provide an indication of the rotational position of cylinder 84.

In a preferred embodiment of the invention, a slotted cylinder, such as cylinder 84, is used as a slot scanner or an ROI highlighter in combination with a direct backillumination system, such as florescent lighting. In such an embodiment, cylinder 84 is preferably located between the direct backillumination system and the faceplate or at an upper or lower edge of the direct backillumination system. When cylinder 84 is incorporated into a backprojection system, cylinder 84 can back-illuminate the faceplate either directly or through the backprojection optics, without obstructing the direct backillumination.

It should be appreciated that a light recycling/forming element other than a cylinder may be used. For example, a sphere with a square hole formed therein can project a square ROI.

Other methods of light recycling can also be used in a backprojection system. For example in a two LCA mask generator, if the masking LCA nearer light source 72 is a PDLC (polymer dispersed LC), light which is not transmitted through the LCA is reflected back towards light source 72 and backreflector 74.

It should be appreciated that light recycling is desirable in most types of viewboxes, including those which are not projection-back-illuminated. For example, a PDLC layer nearer the light source in a florescent-back-illuminated viewbox also yields significant amounts of light recycling.

FIG. 9 shows a motorized viewbox 100 according to another preferred embodiment of the invention. There are two main types of motorized viewboxes. One type uses a lateral belt to transport transparencies 24 in lateral direction 102 from a storage location to faceplate 126. Another type uses a vertical belt to transport transparencies 24 in a vertical direction from the storage location to faceplate 126. Transparencies 24 may be mounted either on clips or in pockets of a transparent belt.

Figure 10A:
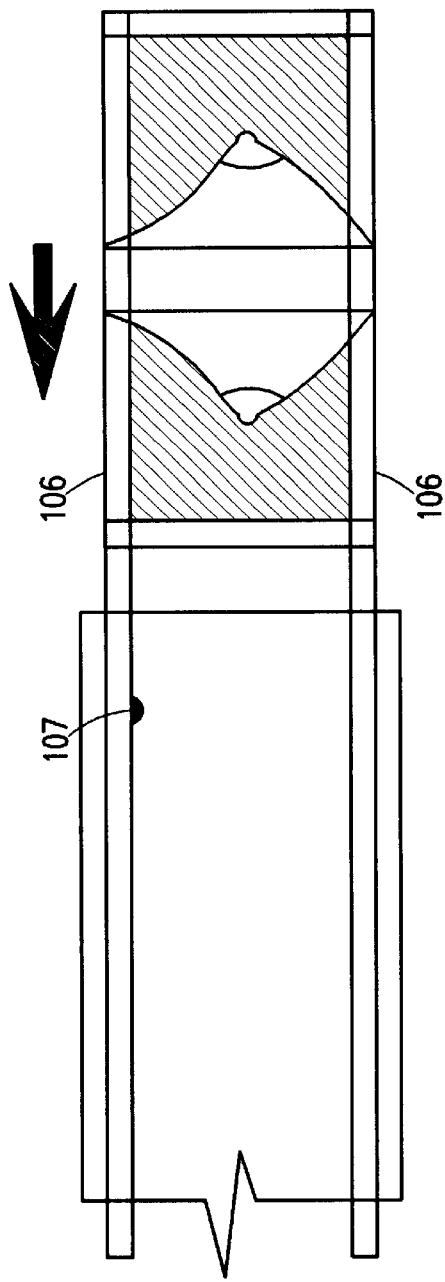
FIG. 10A is a partial front view of two transparencies and an optical sensor for detecting the size and relative placement of the films.
Figure 10B:
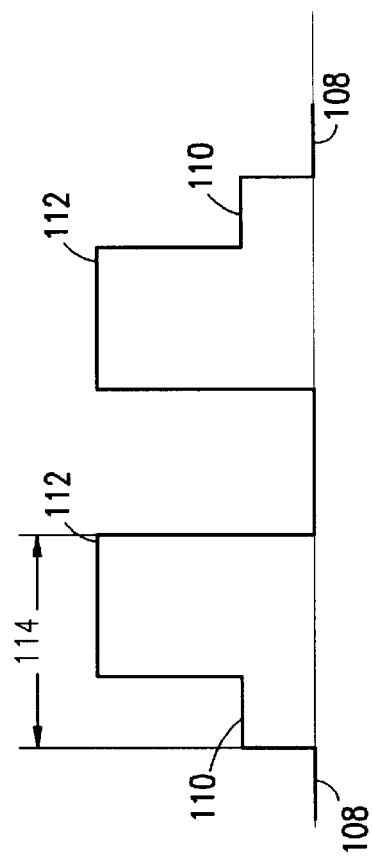
FIG. 10B shows an output signal of the sensor of FIG. 10A.

A camera can be used to detect the size, location and/or morphology of transparencies 24 on faceplate 126, as described WO96/17269. However, in a preferred embodiment of the invention, a single optical sensor is used to determine both transparency size and lateral placement on faceplate 126. FIG. 10A is a partial schematic view of two transparencies 24 which are laterally transported to faceplate 126 using a belt 106. A sensor 107 is located so that both of transparencies 24 must pass sensor 127 during their transport. Sensor 107 preferably comprises two portions, one light emitting and one light detecting; transparencies 24 pass between the two portions of sensor 107. Alternatively, the light source for sensor 107 is the backillumination of viewbox 100. FIG. 10B shows the output signal of sensor 107 when transparencies 24 are transported past it (in an example where the signal intensity is positively related to the amount of optical obstruction of sensor 107). A low output signal 108 corresponds to the times when there is no transparency disposed between the portions of sensor 107 (no obstruction). A medium output signal 110 corresponds to the times when there is a transparent portion of transparency 24 between the portions of sensor 107 (some obstruction) and a high output signal 112 corresponds to dark portions of transparencies 24 (most amount of obstruction). The length 114 of the transparency corresponds to one of the transparency dimensions, thus, the transparency size can be determined from this value. The location of transparencies 24 on faceplate 126 can be determined from a known position of belt 106 relative to faceplate 106.

In a preferred embodiment of the invention, sensor 107 comprises a polarized light source, which can more easily detect unexposed transparency portions, as described above.

In a preferred embodiment of the invention, sensor 107 has a rectangular aperture having a significant extent in a direct perpendicular to the movement of belt 106, to improve the quality of detection. For example, by averaging small changes in the transmission of light through the transparency.

Alternatively to using an optical sensor, a resistance sensor, as described above, may be used to determine the extent of the transparency during its passage of sensor 107.

In an alternative preferred embodiment, a vertical transport system is used and the size and locations of transparencies 24 are determined using an imaging bar 116 (shown in FIG. 9).

Figure 11A:
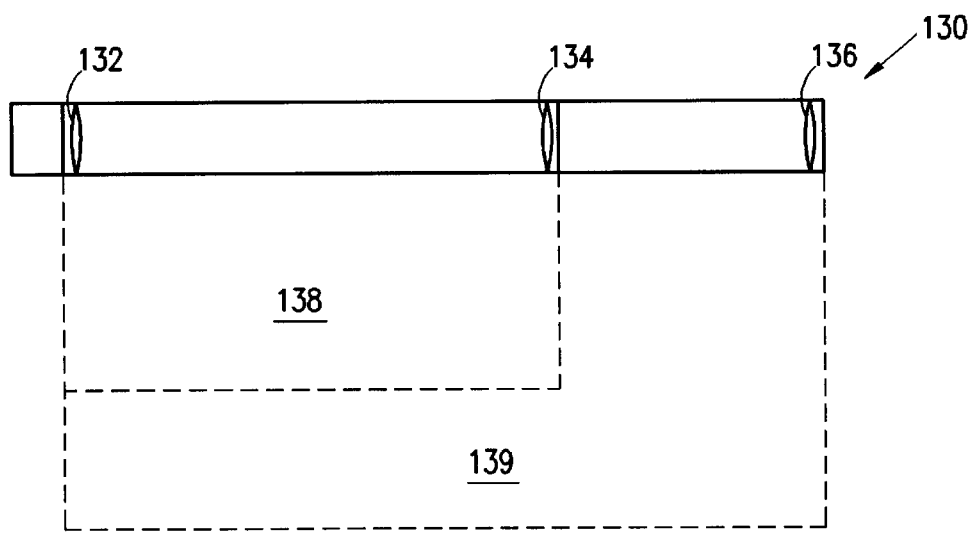
FIG. 11A shows a transparency frame having guided placement for a motorized viewbox according to a preferred embodiment of the invention.

It should be appreciated that if the placement of transparencies 24 into the transport belt is guided, the size of the transparency can be determined using a simple binary logic and, typically, only one sensor, such as described above with reference to FIG. 4A. In addition, the distance between the transparencies can be preset so that the width of the masked portion therebetween is known. FIG. 11A shows a transparency holder 130 having guided placement according to a preferred embodiment of the invention. Holder 130 is adapted to hold two transparency sizes, a transparency 138 and a transparency 139. Clips 132, 134 and 136 are located along holder 130 such that transparency 138 can only be mounted in one stable position, namely, at the left of holder 130. Transparency 139 is of the same size as holder 130, so that only one placement option is available for this size transparency.

In should be appreciated, that the use of soft masking, as described above, can compensate for imprecise transparency placement, so that the placement guidance does not have to be very precise.

Figure 11B:
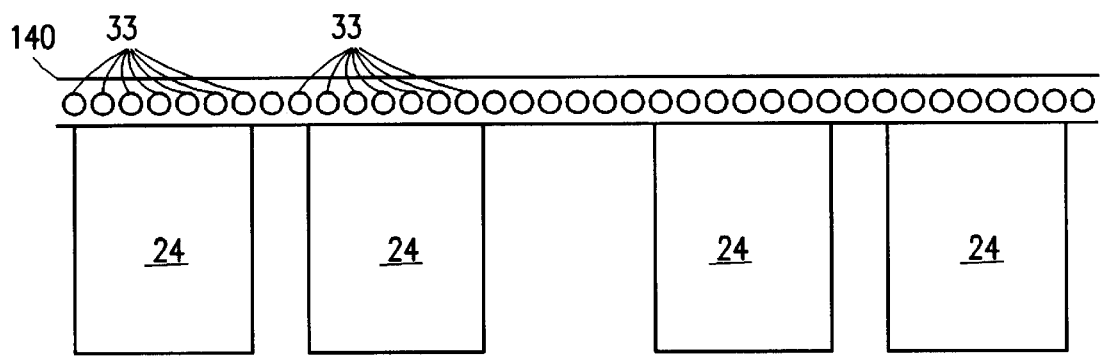
FIG. 11B shows a position sensing transparency belt, useful for a motorized viewbox according to a preferred embodiment of the invention.

FIG. 11B shows transparencies 24 are mounted onto a belt 140 for transport, according to a preferred embodiment of the invention. Belt 140 contains position a plurality of sensing elements 33, as described above with reference to clip 28. In addition, the relative positions of belt 140 and faceplate 126 are known, such as by using an optical position encoder. Thus, when belt 140 is brought onto faceplate 126, the sizes of transparencies 24 and the positions of transparencies 24 (relative to the belt) can be determined as described above with reference to clip 28. A desired masking pattern for faceplate 126 can then be determined using the determined sizes and position of the transparencies and the known positional relationship between belt 140 and faceplate 126. It should be appreciated that such a mechanism can be used when the movement of belt 140 is manual, so that an exact position of transparency corners cannot be expected.

An alternative method of determining transparency size is to modulate the intensity of the back illumination and sense the amount of emitted light using an light sensor. Since there are only two film sizes it is relatively simple to determine which film size is mounted on faceplate 126 from the effect of the light modulation on the amount of light acquired by the light sensor.

Although various embodiments, forms and modifications have been shown, described and illustrated above in some detail in accordance with the invention, it will be understood that the descriptions and illustrations are offered merely by way of examples, and that the invention is not limited thereto but encompasses all variations and alternatives falling within the scope of the appended claims and is to be limited in scope only by the appended claims.

What is claimed is:

1. A viewbox, comprising:
   a faceplate adapted for mounting of a transparency on a front face thereof;
   a back-illumination source;
   a mask-generator, situated between the back-illumination source and the front face, wherein said mask-generator and back-illumination source generate a moving mask that defines a moving back-illuminated region of interest, such that said moving-mask scans a transparency, when a transparency is mounted on the faceplate, at a plurality of positions thereof; and
   a control operative to momentarily increase the intensity of back-illumination in the region of interest at a particular position of the moving mask.

2. A viewbox according to claim 1, wherein the control is a foot-pedal.

3. A viewbox comprising;
   a light source;
   a housing, enclosing said light source, and having a first aperture therein;
   a faceplate adapted for holding a film transparency having an area thereon; and
   means for rotating said housing so that light is emitted from the first aperture to scan said transparency.

4. A viewbox according to claim 3, wherein the first aperture comprises a rectangular slot.

5. A viewbox according to claim 3 wherein the housing defines a second aperture, wherein when said housing is rotated such that the second aperture is disposed between the light source and the faceplate, an area of the faceplate equal to an area of a transparency when mounted thereon is illuminated.

6. A viewbox according to claim 5, including means for reducing the intensity of the light source when the faceplate is illuminated by light from the first aperture as compared to the intensity of the light source when the faceplate is illuminated by light from the second aperture.

7. A viewbox according to claim 5 comprising a reflector adjacent to the housing which reflects light, which is emitted via either or both of the first and second apertures and does not back-illuminate the faceplate, back into the housing.

8. A viewbox according to claim 3 comprising a second back-illumination source which back-illuminates the faceplate.

9. A viewbox according to claim 8 comprising a mask generator which modulates light from the second back-illumination source for back-illumination the faceplate.

10. A viewbox comprising:
    a light source;
    a housing, enclosing said light source, and having a first aperture therein;
    a faceplate adapted for holding a film transparency having an area thereon;
    means for rotating said housing so that light is emitted from the first aperture to scan said transparency; and
    a masking liquid crystal array for masking portions of said emitted light.

11. A viewbox according to claim 10, wherein said liquid crystal array comprises vertical segments.

12. A viewbox comprising:
    a faceplate adapted for mounting a transparency thereon;
    a source of back-illumination, which provides back-illumination of the faceplate and of a transparency is mounted thereon;
    a transparency detector which is capable of determining a loci associated with a transparency, when a transparency is mounted on the faceplate; and
    a mask-generator which spatially modulates the back-illumination to illuminate a portion of the faceplate, corresponding to at least a portion of a transparency, when a transparency is mounted thereon, responsive to the determined loci,
    wherein the transparency detector can only differentiate between two transparency sizes.

13. A view box according to claim 12, wherein, when two transparencies are mounted on the faceplate spaced apart by a distance, the transparency dectector is capable of detecting the distance between two transparencies.

14. A viewbox comprising:
    a faceplate adapted for mounting a pair of transparencies thereon;
    a back-illumination source, which provides back-illumination of the faceplate and of a transparency when a transparency is mounted thereon;

a transparency dectector which, when two transparencies are mounted on the faceplate spaced apart by a distance, is capable of determining the size of the transparencies and the distance between the pair of transparencies; and a mask generator which spatially modulates the back-illumination to illuminate portions of the faceplate that relate to corresponding portions of each of two transparencies mounted on the faceplate, responsive to the determined size and distance.

15. A viewbox comprising:

a faceplate adapted for mounting of a transparency thereon and having a guide for guiding the transparency into a predetermined mounting position;

a back-illumination source;

a transparency detector which determines a size associated with the transparency; and a mask-generator which spatially modulates the back-illumination to illuminate at least a portion of the transparency, responsive to the determined size,
    wherein the faceplate is adapted for mounting a second transparency having a second predetermined mounting position, wherein the guide separates and determines the two predetermined mounting positions.

16. A viewbox comprising:

a faceplate adapted for mounting of a transparency thereon and having a guide for guiding the transparency into a predetermined mounting positions;

a back-illumination source;

a transparency detector which determines a size associated with the transparency; and a mask-generator which apatially modulates the back-illumination to illumination at least a portion of the transparency responsive to the determined size,
    wherein the faceplate is adapted for mounting a second transparency having a second predetermined mounting position, wherein the guide separates and determines the two predetermined mounting positions; and wherein the mask generator comprises a directly addressed light valve having a first segment corresponding to a first transparency size and a second segment corresponding to a second transparency size.

17. A viewbox according to claim 16, wherein the light valve is a segmented liquid crystal.

* * * * *